(12) United States Patent
Cohen et al.

(10) Patent No.: US 11,645,831 B2
(45) Date of Patent: May 9, 2023

(54) IDENTIFICATION OF AN ARRAY IN A SEMICONDUCTOR SPECIMEN

(71) Applicant: Applied Materials Israel Ltd., Rehovot (IL)

(72) Inventors: Yehuda Cohen, Moshav Timorim (IL); Rafael Bistritzer, Petach Tikva (IL)

(73) Assignee: Applied Materials Israel Ltd., Rehovot (IL)

( * ) Notice: Subject to any disclaimer, the term of this patent is extended or adjusted under 35 U.S.C. 154(b) by 380 days.

(21) Appl. No.: 16/922,977

(22) Filed: Jul. 7, 2020

(65) Prior Publication Data

US 2022/0012861 A1    Jan. 13, 2022

(51) Int. Cl.
*G06T 7/00*    (2017.01)
*G06K 9/62*    (2022.01)
*G06V 10/75*    (2022.01)

(52) U.S. Cl.
CPC ............ *G06T 7/001* (2013.01); *G06K 9/6218* (2013.01); *G06V 10/758* (2022.01); *G06T 2207/30148* (2013.01)

(58) Field of Classification Search
None
See application file for complete search history.

(56) References Cited

U.S. PATENT DOCUMENTS

| 2001/0053245 | A1* | 12/2001 | Sakai | G06T 7/32 |
| | | | | 382/218 |
| 2004/0263834 | A1* | 12/2004 | Alumot | G01N 21/94 |
| | | | | 356/237.2 |
| 2009/0257644 | A1 | 10/2009 | Dodzin et al. | |
| 2012/0308113 | A1 | 12/2012 | Dodzin et al. | |
| 2020/0126830 | A1* | 4/2020 | Dowling | G06T 7/001 |

* cited by examiner

*Primary Examiner* — Chan S Park
*Assistant Examiner* — Elisa M Rice
(74) *Attorney, Agent, or Firm* — Lowenstein Sandler LLP

(57) ABSTRACT

There is provided a method and a system configured obtain an image of a semiconductor specimen including one or more arrays, each including repetitive structural elements, and one or more regions, each region at least partially surrounding a corresponding array and including features different from the repetitive structural elements, wherein the PMC is configured to, during run-time scanning of the semiconductor specimen, perform a correlation analysis between pixel intensity of the image and pixel intensity of a reference image informative of at least one of the repetitive structural elements, to obtain a correlation matrix, use the correlation matrix to distinguish between one or more first areas of the image corresponding to the one or more arrays and one or more second areas of the image corresponding the one or more regions, and output data informative of the one or more first areas of the image.

18 Claims, 15 Drawing Sheets

IDENTIFICATION OF AN ARRAY IN A SEMICONDUCTOR SPECIMEN

TECHNICAL FIELD

The presently disclosed subject matter relates, in general, to the field of examination of a specimen, and more specifically, to automating the examination of a specimen.

BACKGROUND

Current demands for high density and performance associated with ultra large scale integration of fabricated devices require submicron features, increased transistor and circuit speeds, and improved reliability. Such demands require formation of device features with high precision and uniformity, which, in turn, necessitates careful monitoring of the fabrication process, including automated examination of the devices while they are still in the form of semiconductor wafers.

Examination processes are used at various steps during semiconductor fabrication to detect and classify defects on specimens. Effectiveness of examination can be increased by automatization of process(es) as, for example, Automatic Defect Classification (ADC), Automatic Defect Review (ADR), etc.

GENERAL DESCRIPTION

In accordance with certain aspects of the presently disclosed subject matter, there is provided a system to examine a semiconductor specimen, the system comprising a processor and memory circuitry (PMC) configured to obtain an image of the semiconductor specimen including one or more arrays, each including repetitive structural elements, one or more regions, each region at least partially surrounding a corresponding array and including features different from the repetitive structural elements, wherein the PMC is configured to, during run-time scanning of the semiconductor specimen, perform a correlation analysis between pixel intensity of the image and pixel intensity of a reference image informative of at least one of the repetitive structural elements, to obtain a correlation matrix, use the correlation matrix to distinguish between one or more first areas of the image corresponding to the one or more arrays and one or more second areas of the image corresponding the one or more regions, and output data informative of the one or more first areas of the image.

According to some embodiments, the system is configured to determine sub-areas of the image corresponding to values of the correlation matrix meeting an amplitude criterion, cluster the sub-areas into one or more clusters, based on data informative of a distance between the repetitive structural elements in the array, and determine the one or more first areas based at least on the one or more clusters.

According to some embodiments, the one or more arrays are separated from the one or more regions by one or more borders, wherein the system is configured to estimate the one or more first areas of the image including only the at least one or more arrays up to the borders.

According to some embodiments, the system is configured to apply image processing to the reference image, wherein the image processing attenuates repetitive patterns of the reference image.

According to some embodiments, the system is configured to cluster the sub-areas into one or more first clusters, based on data informative of a distance between the repetitive structural elements in the array along a first axis, cluster the sub-areas into one or more second clusters, based on data informative of a distance between the repetitive structural elements in the array along a second axis, and use the first and second clusters to distinguish between one or more first areas of the image corresponding to the one or more arrays and one or more second areas of the image corresponding to the one or more regions.

According to some embodiments, the system is configured, for each cluster, to determine a polygon surrounding one or more clusters, and output the polygon as a first area of the image.

According to some embodiments, the system is configured to select only clusters for which a number of sub-areas meets a threshold.

According to some embodiments, the system is configured to obtain data informative of the amplitude criterion in a setup phase prior to run-time examination of the semiconductor specimen.

According to some embodiments, the system is configured to perform a correlation analysis between pixel intensity of the one or more first areas of the image and pixel intensity of a second reference image informative of at least one of the repetitive structural elements, to obtain a second correlation matrix, determine sub-areas of the one or more first areas of the image corresponding to values of the second correlation matrix meeting an amplitude criterion, determine a map of deformation between the one or more first areas of the image and the array, based at least on a position of the sub-areas in the one or more first areas of the image and data informative of an expected position of the repetitive structural elements in the array, and generate a corrected image based on the map of deformation.

According to some embodiments, the system is configured to generate the corrected image such that a position of the sub-areas in the corrected image and data informative of an expected position of the repetitive structural elements in the array meet a proximity criterion.

According to some embodiments, the system is configured to determine deformation $DF_{central}$ between a position of the sub-areas in the one or more first areas of the image and data informative of an expected position of the repetitive structural elements in the array, and determine a map of deformation between the one or more first areas of the image and the array of the semiconductor specimen, based on an interpolation method applied at least to $DF_{central}$.

According to some embodiments, the system is configured to obtain a reference image informative of at least one of the repetitive structural elements and to select only a subset of the reference image as the second reference image.

In accordance with other aspects of the presently disclosed subject matter, there is provided a method of examining a semiconductor specimen, the method including, by a processor and memory circuitry (PMC), obtaining an image of the semiconductor specimen including one or more arrays, each including repetitive structural elements, one or more regions, each region at least partially surrounding a corresponding array and including features different from the repetitive structural elements; during run-time scanning of the semiconductor specimen, performing a correlation analysis between pixel intensity of the image and pixel intensity of a reference image informative of at least one of the repetitive structural elements, to obtain a correlation matrix, using the correlation matrix to distinguish between one or more first areas of the image corresponding to the one or more arrays and one or more second areas of the image corresponding the one or more regions, and outputting data informative of the one or more first areas of the image.

According to some embodiments, the method includes determining sub-areas of the image corresponding to values of the correlation matrix meeting an amplitude criterion, clustering the sub-areas into one or more clusters, based on data informative of a distance between the repetitive structural elements in the array, and determining the one or more first areas based at least on the one or more clusters.

According to some embodiments, the one or more arrays are separated from the one or more regions by one or more borders, wherein the method includes estimating the one or more first areas of the image including only the at least one or more arrays up to the borders, and excluding the one or more second areas corresponding to the one or more regions.

According to some embodiments, the method comprises clustering the sub-areas into one or more first clusters, based on data informative of a distance between the repetitive structural elements in the array along a first axis, clustering the sub-areas into one or more second clusters, based on data informative of a distance between the repetitive structural elements in the array along a second axis, and using the first and second clusters to distinguish between one or more first areas of the image corresponding to the one or more arrays and one or more second areas of the image corresponding to the one or more regions.

According to some embodiments, the method includes selecting only clusters for which a number of sub-areas meets a threshold.

According to some embodiments, the method includes performing a correlation analysis between pixel intensity of the one or more first areas of the image and pixel intensity of a second reference image informative of at least one of the repetitive structural elements, to obtain a second correlation matrix, determining sub-areas of the one or more first areas of the image corresponding to values of the second correlation matrix meeting an intensity criterion, determining a map of deformation between the one or more first areas of the image and the array, based at least on a position of the sub-areas in the one or more first areas of the image and data informative of an expected position of the repetitive structural elements in the array, and generating a corrected image based on the map of deformation.

According to some embodiments, the method includes determining deformation $DF_{central}$ between a position of the sub-areas in the one or more first areas of the image and data informative of an expected position of the repetitive structural elements in the array, and determining a map of deformation between the one or more first areas of the image and the array of the semiconductor specimen, based on an interpolation method applied at least to $DF_{central}$.

In accordance with other aspects of the presently disclosed subject matter, there is provided a non-transitory computer readable medium comprising instructions that, when executed by a PMC, cause the PMC to perform operations as described above.

In accordance with other aspects of the presently disclosed subject matter, there is provided a system of examination of a semiconductor specimen, the system comprising a processor and memory circuitry (PMC) configured to obtain an image of the semiconductor specimen including one or more arrays, each including repetitive structural elements, one or more regions, each region at least partially surrounding a corresponding array and including features different from the repetitive structural elements, obtain data $D_{threshold}$ informative of pixel intensity of at least one of the one or more arrays and the one or more regions, wherein the PMC is configured to, during run-time scanning of the semiconductor specimen, determine data $D_X$, $D_Y$ representative of pixel intensity along a plurality of axis in the image, use $D_X$, $D_Y$ and $D_{threshold}$ to distinguish between one or more first areas of the image corresponding to the one or more arrays and one or more second areas of the image corresponding to the one or more regions, and output data informative of the one or more first areas of the image.

According to some embodiments, the system is configured to determine data $D_X$ representative of pixel intensity along each of a plurality of lines of the image, determine data $D_Y$ representative of pixel intensity along each of a plurality of columns of the image, use $D_X$, $D_Y$ and $D_{threshold}$ to distinguish between one or more first areas of the image corresponding to the one or more arrays and one or more second areas of the image corresponding the one or more regions, and output data informative of the one or more first areas of the image.

According to some embodiments, each of the one or more arrays includes structural elements which are not differentiable by visual inspection of the image.

According to some embodiments, the system is configured to determine data $D_X$ representative of pixel intensity along each of a plurality of lines of the image, select a subset SL of the image including lines of the image for which $D_X$ is above a first threshold, determine data $D_{Y,SL}$ representative of pixel intensity along each of a plurality of columns of the subset SL, determine a subset $C_{SL}$ of columns of SL for which $D_{Y,L}$ is above a second threshold, determine the one or more first areas based at least on $C_{SL}$.

According to some embodiments, the system is configured to determine data $D_Y$ representative of pixel intensity along each of a plurality of columns of the image, select a subset $S_C$ of the image including columns of the image for which $D_Y$ is above a first threshold, determine data $D_{X,SC}$ representative of pixel intensity along each of a plurality of lines of the subset $S_C$, determine a subset $L_{SC}$ of lines of $S_C$ for which $D_{X,SC}$ is above a second threshold, and determine the one or more first areas based at least on $L_{SC}$.

According to some embodiments, the first threshold is stricter than the second threshold. According to some embodiments, the first threshold is stricter than the third threshold.

According to some embodiments, there is provided a corresponding method (comprising operations as described above with reference to the system) and a non-transitory computer readable medium comprising instructions that, when executed by a PMC, cause the PMC to corresponding operations.

According to some embodiments, the proposed solution enables distinguishing, in an image of a semiconductor specimen, between an array including repetitive structural elements and a surrounding region including features different from the repetitive structural elements. According to some embodiments, the proposed solution is efficient and is operative during run-time scanning of a semiconductor specimen. According to some embodiments, a precise identification of the array is provided, enabling extracting the array up to borders of the array separating the array and the surrounding region. According to some embodiments, the proposed solution enables correction of a distortion present in an image of the array. In particular, efficient and precise correction is enabled.

BRIEF DESCRIPTION OF THE DRAWINGS

In order to understand the disclosure and to see how it may be carried out in practice, embodiments will now be described, by way of non-limiting example only, with reference to the accompanying drawings, in which.

DETAILED DESCRIPTION OF EMBODIMENTS

Figure 1:
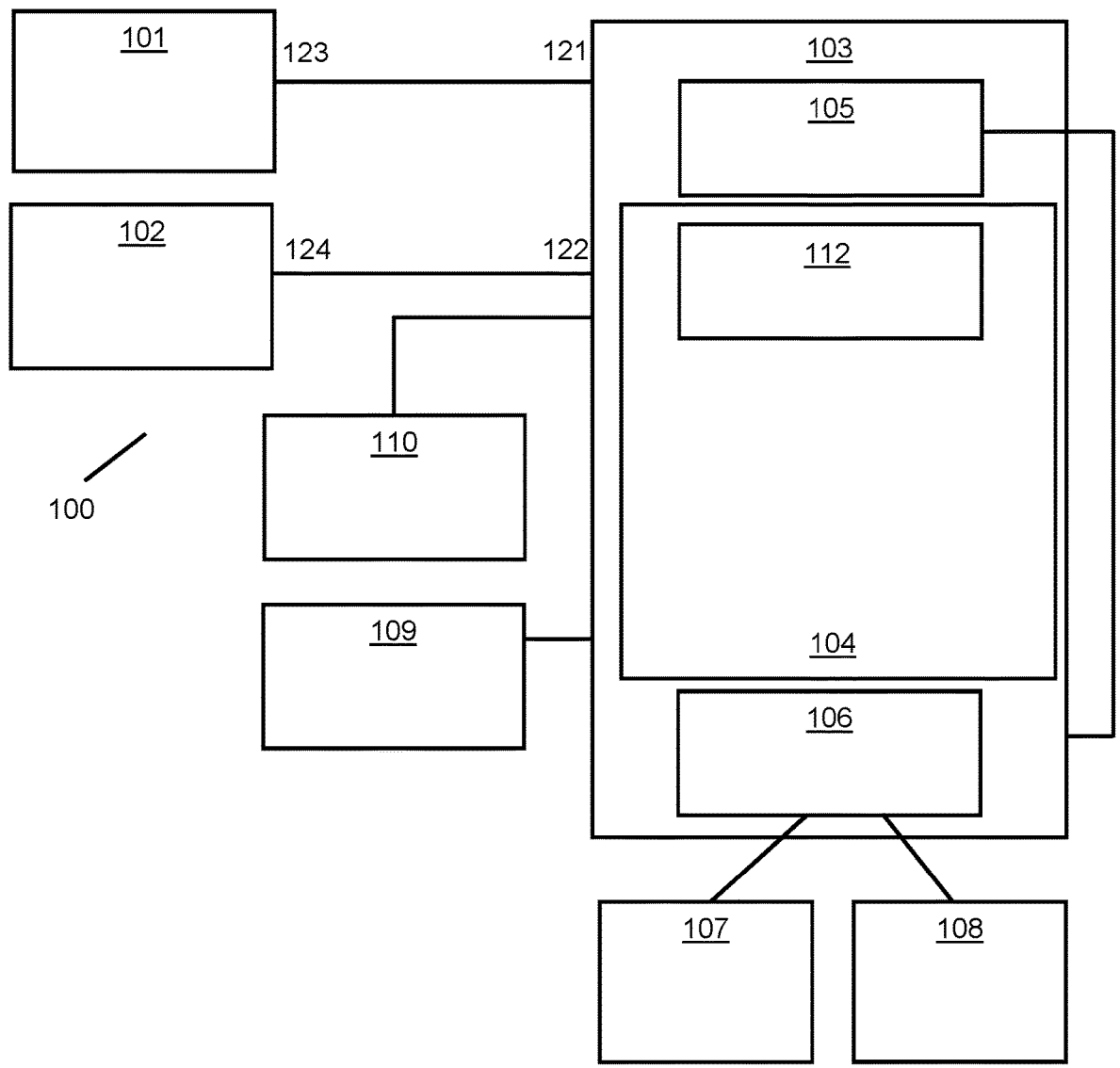
FIG. 1 illustrates a generalized block diagram of an examination system in accordance with certain embodiments of the presently disclosed subject matter.

In the following detailed description, numerous specific details are set forth in order to provide a thorough understanding of the disclosure. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "processing", "obtaining", "selecting", "determining", "generating", "outputting", "using", "performing" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the system 103 and respective parts thereof disclosed in the present application.

The terms "non-transitory memory" and "non-transitory storage medium" used herein should be expansively construed to cover any volatile or non-volatile computer memory suitable to the presently disclosed subject matter.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

The term "examination" used in this specification should be expansively construed to cover any kind of metrology-related operations as well as operations related to detection and/or classification of defects in a specimen during its fabrication. Examination is provided by using non-destructive examination tools during or after manufacture of the specimen to be examined. By way of non-limiting example, the examination process can include runtime scanning (in a single or in multiple scans), sampling, reviewing, measuring, classifying and/or other operations provided with regard to the specimen or parts thereof using the same or different inspection tools. Likewise, examination can be provided prior to manufacture of the specimen to be examined and can include, for example, generating an examination recipe(s) and/or other setup operations. It is noted that, unless specifically stated otherwise, the term "examination" or its derivatives used in this specification are not limited with respect to resolution or size of an inspection area. A variety of non-destructive examination tools includes, by way of non-limiting example, scanning electron microscopes, atomic force microscopes, optical inspection tools, etc.

By way of non-limiting example, run-time examination can employ a two phase procedure, e.g. inspection of a specimen followed by review of sampled locations of potential defects. During the first phase, the surface of a specimen is inspected at high-speed and relatively low-resolution. In the first phase, a defect map is produced to show suspected locations on the specimen having high probability of a defect. During the second phase at least some of the suspected locations are more thoroughly analyzed with relatively high resolution. In some cases, both phases can be implemented by the same inspection tool, and, in some other cases, these two phases are implemented by different inspection tools.

The term "defect" used in this specification should be expansively construed to cover any kind of abnormality or undesirable feature formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats such as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Bearing this in mind, attention is drawn to FIG. 1 illustrating a functional block diagram of an examination system in accordance with certain embodiments of the presently disclosed subject matter. The examination system 100 illustrated in FIG. 1 can be used for examination of a specimen (e.g. of a wafer and/or parts thereof) as a part of the specimen fabrication process. The illustrated examination system 100 comprises computer-based system 103 capable of automatically determining metrology-related and/or defect-related information using images obtained during specimen fabrication. System 103 can be operatively connected to one or more low-resolution examination tools 101 and/or one or more high-resolution examination tools 102 and/or other examination tools. The examination tools are configured to capture images and/or to review the captured image(s) and/or to enable or provide measurements related to the captured image(s). System 103 can be further operatively connected to CAD server 110 and data repository 109.

System 103 includes a processor and memory circuitry (PMC) 104 operatively connected to a hardware-based input interface 105 and to a hardware-based output interface 106. PMC 104 is configured to provide all processing necessary for operating the system 103 as further detailed hereinafter (see e.g. methods described in FIGS. 2 to 5, 6, 8 and 9 which can be performed at least partially by system 103) and includes a processor (not shown separately) and a memory (not shown separately). The processor of PMC 104 can be configured to execute several functional modules in accordance with computer-readable instructions implemented on a non-transitory computer-readable memory comprised in the PMC. Such functional modules are referred to hereinafter as comprised in the PMC. Functional modules comprised in PMC 104 include a deep neural network (DNN) 112. DNN 112 is configured to enable data processing using a machine learning algorithm for outputting application-related data based on the images of specimens.

By way of non-limiting example, the layers of DNN 112 can be organized in accordance with Convolutional Neural Network (CNN) architecture, Recurrent Neural Network architecture, Recursive Neural Networks architecture, Generative Adversarial Network (GAN) architecture, or otherwise. Optionally, at least some of the layers can be organized in a plurality of DNN subnetworks. Each layer of the DNN can include multiple basic computational elements (CE), typically referred to in the art as dimensions, neurons, or nodes.

Generally, computational elements of a given layer can be connected with CEs of a preceding layer and/or a subsequent layer. Each connection between a CE of a preceding layer and a CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function, or other suitable function. The output from the given CE can be transmitted to CEs of a subsequent layer via the respective connections. Likewise, as above, each connection at the output of a CE can be associated with a weighting value which can be applied to the output of the CE prior to being received as an input of a CE of a subsequent layer. Further to the weighting values, there can be threshold values (including limiting functions) associated with the connections and CEs.

The weighting and/or threshold values of DNN 112 can be initially selected prior to training, and can be further iteratively adjusted or modified during training to achieve an optimal set of weighting and/or threshold values in a trained DNN. After each iteration, a difference (also called loss function) can be determined between the actual output produced by DNN 112 and the target output associated with the respective training set of data. The difference can be referred to as an error value. Training can be determined to be complete when a cost or loss function indicative of the error value is less than a predetermined value, or when a limited change in performance between iterations is achieved. Optionally, at least some of the DNN subnetworks (if any) can be trained separately, prior to training the entire DNN.

System 103 is configured to receive, via input interface 105, input data. Input data can include data (and/or derivatives thereof and/or metadata associated therewith) produced by the examination tools and/or data produced and/or stored in one or more data repositories 109 and/or in CAD server 110 and/or another relevant data depository. It is noted that input data can include images (e.g. captured images, images derived from the captured images, simulated images, synthetic images, etc.) and associated numeric data (e.g. metadata, hand-crafted attributes, etc.). It is further noted that image data can include data related to a layer of interest and/or to one or more other layers of the specimen.

System 103 is further configured to process at least part of the received input data and send, via output interface 106, the results (or part thereof) to a storage system 107, to examination tool(s), to a computer-based graphical user interface (GUI) 108 for rendering the results and/or to external systems (e.g. Yield Management System (YMS) of a FAB). GUI 108 can be further configured to enable user-specified inputs related to operating system 103.

By way of non-limiting example, a specimen can be examined by one or more low-resolution examination machines 101 (e.g. an optical inspection system, low-resolution SEM, etc.). The resulting data (referred to hereinafter as low-resolution image data 121), informative of low-resolution images of the specimen, can be transmitted—directly or via one or more intermediate systems—to system 103. Alternatively or additionally, the specimen can be examined by a high-resolution machine 102 (e.g. a subset of potential defect locations selected for review can be reviewed by a scanning electron microscope (SEM) or Atomic Force Microscopy (AFM)). The resulting data (referred to hereinafter as high-resolution image data 122) informative of high-resolution images of the specimen can be transmitted—directly or via one or more intermediate systems—to system 103.

It is noted that images of a desired location on a specimen can be captured at different resolutions. By way of non-limiting example, so-called "defect images" of the desired location are usable to distinguish between a defect and a false alarm, while so-called "class images" of the desired location are obtained with higher resolution and are usable for defect classification. In some embodiments, images of the same location (with the same or different resolutions) can comprise several images registered therebetween (e.g. images captured from the given location and one or more reference images corresponding to the given location).

It is noted that image data can be received and processed together with metadata (e.g. pixel size, text description of defect type, parameters of image capturing process, etc.) associated therewith.

Upon processing the input data (e.g. low-resolution image data and/or high-resolution image data, optionally together with other data as, for example, design data, synthetic data, etc.), system 103 can send the results (e.g. instruction-related data 123 and/or 124) to any of the examination tool(s), store the results (e.g. defect attributes, defect classification, etc.) in storage system 107, render the results via GUI 108 and/or send to an external system (e.g. to YMS).

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and/or hardware.

Without limiting the scope of the disclosure in any way, it should also be noted that the examination tools can be implemented as inspection machines of various types, such as optical imaging machines, electron beam inspection machines and so on. In some cases, the same examination tool can provide low-resolution image data and high-resolution image data. In some cases, at least one examination tool can have metrology capabilities.

It is noted that the examination system illustrated in FIG. 1 can be implemented in a distributed computing environment, in which the aforementioned functional modules shown in FIG. 1 can be distributed over several local and/or remote devices, and can be linked through a communication network. It is further noted that in other embodiments at least some examination tools 101 and/or 102, data repositories 109, storage system 107 and/or GUI 108 can be external to the examination system 100 and operate in data communication with system 103 via input interface 105 and output interface 106. System 103 can be implemented as stand-alone computer(s) to be used in conjunction with the examination tools. Alternatively, the respective functions of the system can, at least partly, be integrated with one or more examination tools.

Figure 2:
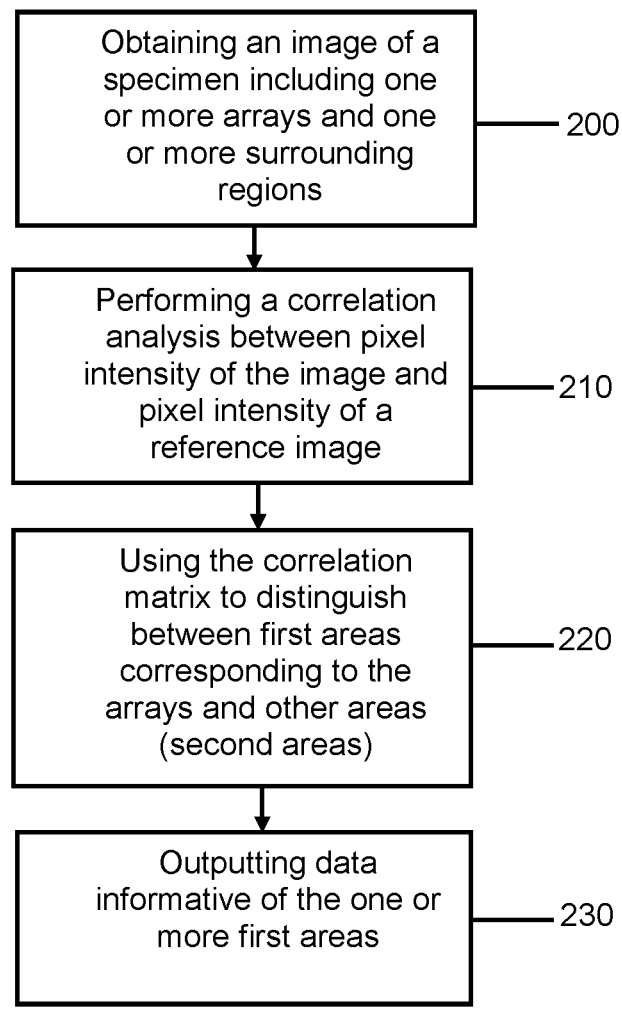
FIG. 2 illustrates a generalized flow-chart of a method of identifying an array including repetitive structural elements in an image of a specimen.

Attention is now drawn to FIG. 2. A method includes obtaining (operation 200) an image 250 of a specimen. According to some embodiments, image 250 is acquired by an examination tool (such as examination tool 101) during run-time scanning of the specimen. The specimen includes one or more arrays 260. The arrays 260 include repetitive structural elements (represented as reference 261 in one of the arrays). The repetitive structural elements include e.g. memory cells (such as SRAM, DRAM, FRAM, Flash memory), programmable logic cells, etc. These examples are not limitative. Generally, the repetitive structural elements are arranged in each array according to a repetitive pattern or grid. For example, distance between two adjacent repetitive structural elements (according to a horizontal axis and a vertical axis) is constant or at least substantially constant among the various arrays.

The specimen includes one or more regions 265. Each region 265 surrounds at least partially a corresponding array 260. The region 265 does not include the repetitive structural elements which are present in the array 260. In the non-limitative example of FIG. 2A, the specimen includes vertical and horizontal regions 265 surrounding the arrays 260. The regions 265 can correspond e.g. to stiches. Each region 265 includes features different from the repetitive structural elements 260. In some embodiments, the regions 265 can include non-repetitive features, and/or repetitive features which are different from the repetitive structural elements 260. Examples of non-repetitive features include e.g. logics. This is however not limitative.

The method further includes performing (operation 210) a correlation analysis between pixel intensity of the image 250 and pixel intensity of a reference image informative of at least one of the repetitive structural elements. The reference image can include e.g. an image of one of the repetitive structural elements. The reference image is also called a "golden cell". According to some embodiments, the reference image is generated based on design data. According to some embodiments, the reference image is obtained from an image of a structural element which is known (e.g. from previous analysis) to be free of defects. According to some embodiments, the reference image is obtained during a setup phase, prior to run-time examination of the specimen. In the setup phase, time and processing constraints are less strict and therefore it is possible to acquire an image of one of the repetitive structural elements which will constitute the reference image.

An output of the correlation analysis performed at 210 can include a correlation matrix, which includes a plurality of values. Each value is associated to a sub-area of the image 250 and indicates the level of correlation between pixel intensity in the sub-area and pixel intensity in the reference image.

Figure 2A:
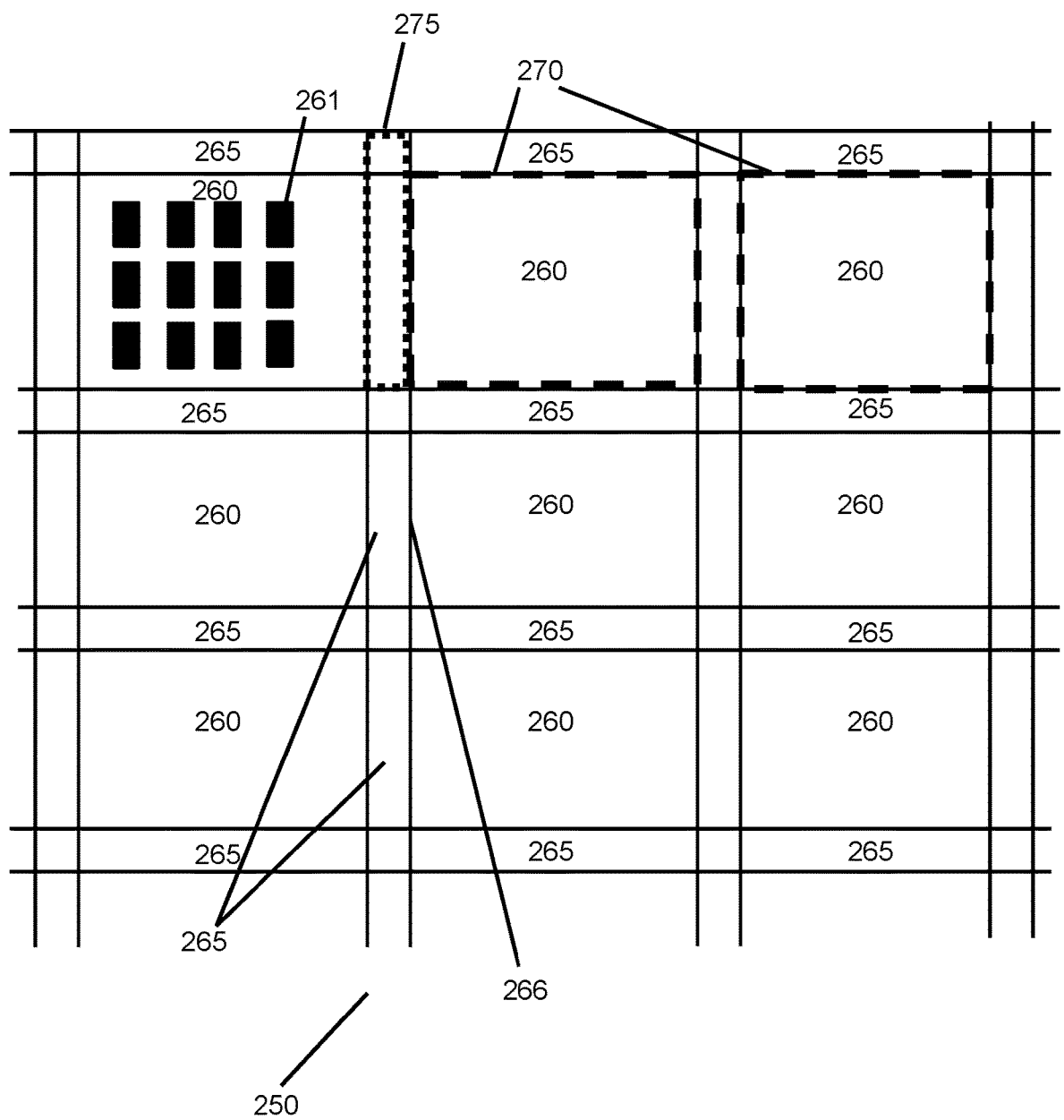
FIG. 2A illustrates a non-limiting example of an image including arrays with repetitive structural elements, and surrounding regions.

The method can further include using (operation 220) the correlation matrix to distinguish between one or more first areas of the image 250 corresponding to the one or more arrays 260 and one or more second areas of the image corresponding to the one or more regions 265. FIG. 2A illustrates examples of the one or more first areas 270 and of the one or more second areas 275. In some embodiments, all areas of the image which have not been identified as belonging to the one or more first areas 270 are considered to be part of the one or more second areas 275.

The method further includes outputting 230 data informative of the one or more first areas 270 of the image 250. This can include e.g. outputting location of the one or more first areas 270 in the image 250, and/or outputting a selection of the image 250 including only the one or more first areas 270. According to some embodiments, the method can include outputting location of the one or more second areas 275, and/or outputting a selection of the image 250 including only the one or more second areas 275.

According to some embodiments, at least operation 210, 220 and 230 are performed during run-time scanning of the specimen. In other words, the method of identification of the arrays in the image is efficient and therefore can be performed during a run-time phase.

According to some embodiments, identification of the one or more first areas 270 in the image is used during run-time scanning of the specimen, e.g. by a PMC configured to determine data representative of defects in the array (e.g. location of the defects, class of the defects, etc.). In particular, the PMC can implement an algorithm for detecting defects, which is specifically tailored to detect defects in an array including repetitive structural elements.

As shown in FIG. 2A, the one or more arrays 260 are separated from the one or more regions 265 by one or more borders 266. The border 266 defines a physical limit between an array 260 and a corresponding surrounding region 265.

According to some embodiments, the method enables estimating the one or more first areas 270 of the image 250 including only the at least one or more arrays 260 up to the borders 266. In particular, according to some embodiments, the method enables identifying the arrays 260 up to the borders 266, excluding the one or more second areas 275 corresponding to the one or more regions 265.

Figure 3:
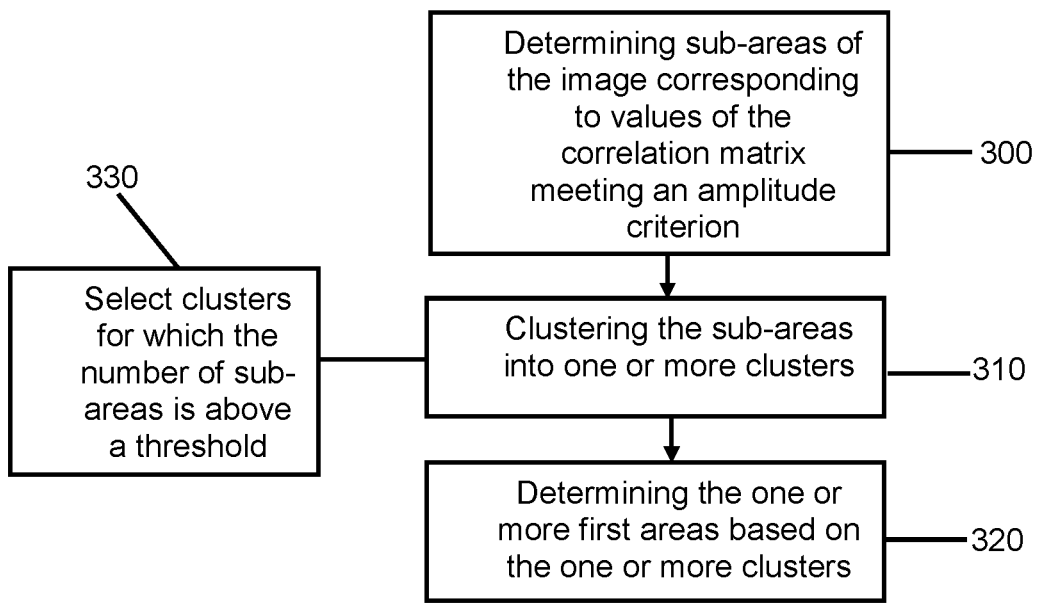
FIG. 3 illustrates a generalized flow-chart of a possible implementation of operations of the method of FIG. 2.

Attention is drawn to FIG. 3 which depicts a non-limitative implementation of operations 210 to 230.

As explained with reference to operation 210, a correlation matrix is obtained. A non-limitative example of a correlation matrix 365 obtained for a given region of the image 250 is depicted in FIG. 3A.

The method can therefore include determining (operation 300) sub-areas of the image 250 corresponding to values of the correlation matrix 365 meeting an amplitude criterion. The amplitude criterion can e.g. define that sub-areas of the image 250 for which a local maximal correlation peak is identified (in some embodiments an absolute threshold can be set) correspond to location of the repetitive structural elements in the image 250. According to some embodiments, during a setup phase prior to run-time examination of the specimen, a first estimation of the amplitude of the correlation peak which is obtained for a sub-area including one of the repetitive structural elements is obtained, which can be used to determine the amplitude criterion used during run-time examination and for which it is considered that a structural element is present.

Figures 3A, 3B:
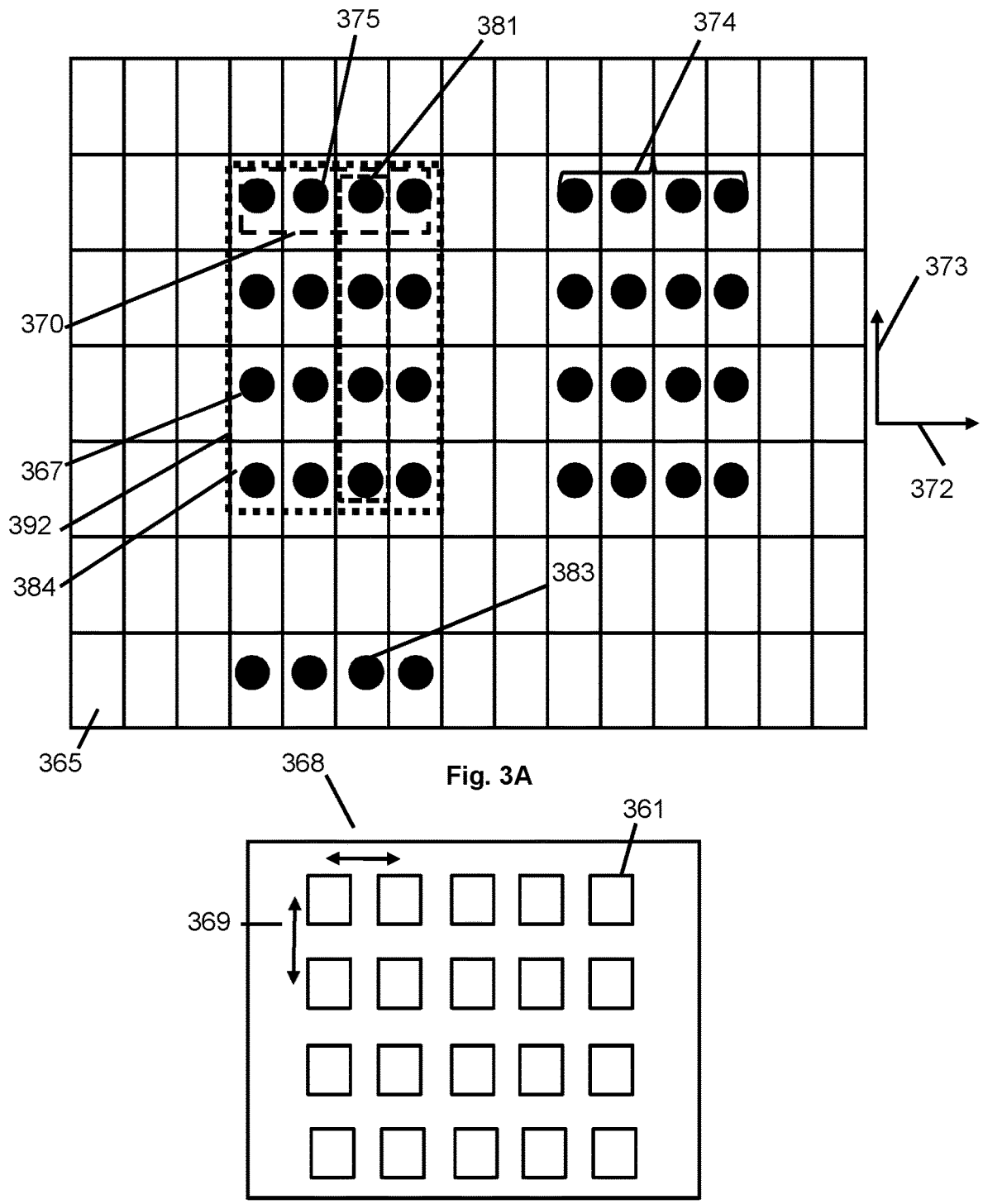
FIG. 3A illustrates a non-limiting example of a correlation matrix obtained using the method of FIG. 2.
FIG. 3B illustrates a non-limiting example of an array including repetitive structural elements.

As shown in FIG. 3A, the correlation matrix 365 includes peaks of correlation 367 (maximal values), located at sub-areas 375 of the image. These sub-areas 375 correspond to an estimation of the location of the repetitive structural elements. Indeed, since the correlation analysis involves correlating pixel intensity of the image with pixel intensity of a reference image informative of a repetitive structural element, it is expected that sub-areas of the image, including the repetitive structural elements, will provide a high correlation value relative to sub-areas of the image (regions 265) which do not include the repetitive structural elements.

The method can further include (operation 310) clustering the sub-areas 375 into one or more clusters, based on data informative of a distance between the repetitive structural elements in the array.

As mentioned above, the repetitive structural elements are generally arranged according to a repetitive pattern or grid. Therefore, it is possible to obtain a distance between two consecutive structural elements in an array. In some embodiments, data (see reference 368 in FIG. 3B) informative of a distance between the repetitive structural elements 361 in the array along a first axis (e.g. horizontal axis, corresponding to lines of the image) and data (see reference 369 in FIG. 3B) informative of a distance between the repetitive structural elements in the array along a second axis (e.g. vertical axis, corresponding to columns in the image) can be obtained. As illustrated, the distance can be evaluated between centres of the structural elements.

According to some embodiments, operation 310 can include clustering the sub-areas 375 into one or more first clusters, based on data informative of a distance between the repetitive structural elements in the array along a first axis 372. According to some embodiments, in a given cluster, any sub-area 375 is located from another sub-area 375 of the cluster at a distance below or equal to the distance between the repetitive structural elements along the first axis. A non-limitative example is illustrated in FIG. 3A, in which sub-areas are assigned to the same cluster 370 along the first axis 372. As shown, sub-areas 374 are not assigned to the cluster 370 since the distance from each sub-area to the cluster 370 is above the distance between two repetitive structural elements along the first axis 372.

According to some embodiments, operation 310 can include clustering the sub-areas into one or more second clusters, based on data informative of a distance between the repetitive structural elements in the array along a second axis 373. According to some embodiments, in a given cluster, any sub-area is located from another sub-area of the cluster at a distance below or equal to the distance between the repetitive structural elements along the second axis 373. A non-limitative example is illustrated in FIG. 3A, in which sub-areas are assigned to the same cluster 381 along the second axis 373. As shown, sub-area 383 is not assigned to the cluster 381 since the distance the sub-area 383 to the cluster 381 is above the distance between two repetitive structural elements along the second axis 373.

The method includes determining (operation 320) the one or more first areas based at least on the one or more clusters. In particular, the first clusters can be used to determine size and location of the one or more first areas along the first axis 372 and the second clusters can be used to determine size and location of the one or more first areas along the second axis 373. For example, cluster 370 provides size and location of a first area along axis 372 and cluster 381, which intersects cluster 370, provides size and location of the same first area along axis 373. As a consequence, a first area 384 is identified. This can be performed for all clusters, which are used to determine limits of the different first areas.

According to some embodiments, another operation is performed to identify first areas using the clusters. In particular, the method can include determining a polygon (e.g. a rectangle, or a square) surrounding one or more clusters identified as defining a first area, and outputting the polygon as the first area. For example, in the example of FIG. 3A, a rectangle 392 can be generated which covers a first area identified based on the first cluster 370 and the second cluster 381.

Figure 3C:
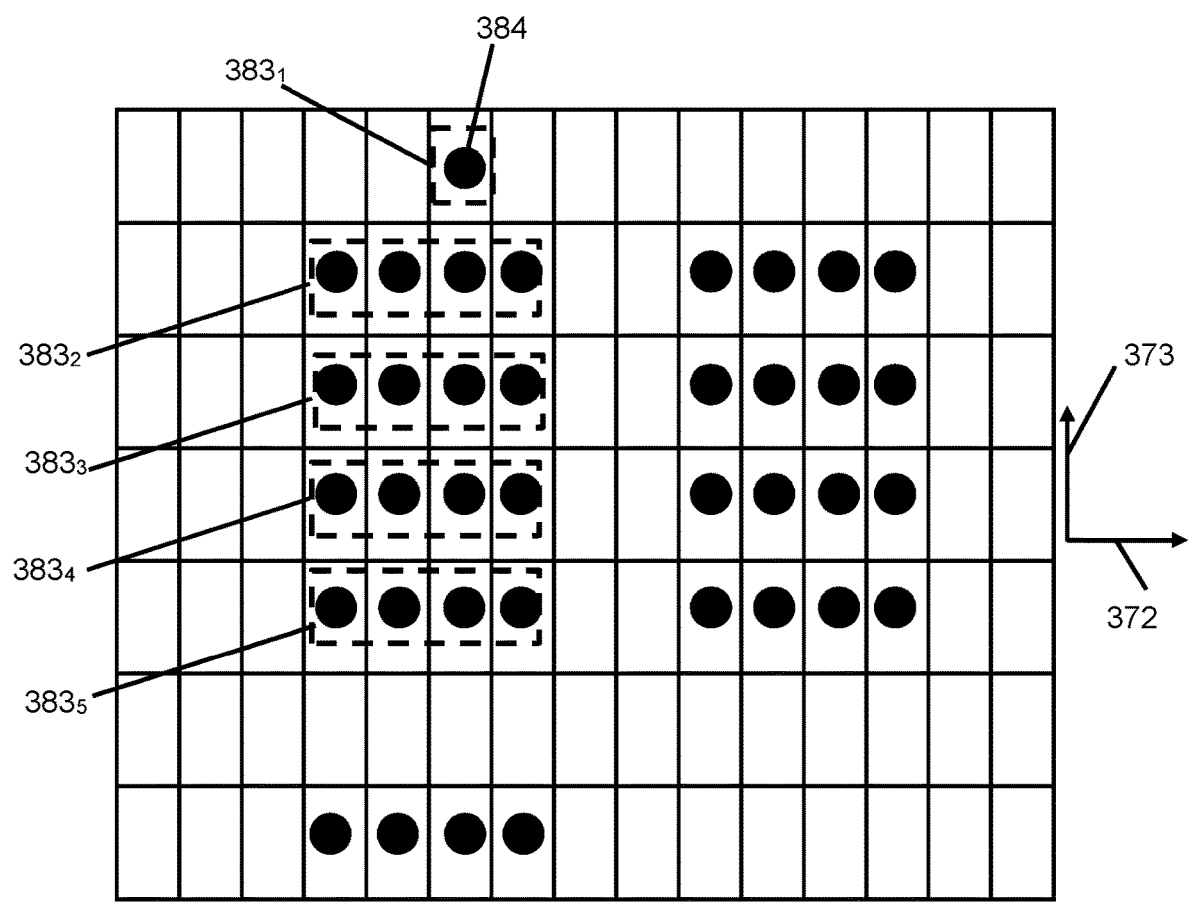
FIG. 3C illustrates another non-limiting example of a correlation matrix obtained using the method of FIG. 2.

Attention is now drawn to FIG. 3C. According to some embodiments, the method can include selecting (operation 330) only clusters for which a number of sub-areas present in the cluster meets a threshold (e.g. is above the threshold). This is illustrated in FIG. 3C. A plurality of clusters $383_1$ to $383_5$ have been identified along axis 372. A cluster, referred to as $383_1$, includes only one sub-area 384. Since it is known that the array includes repetitive structural elements arranged along a repetitive pattern (e.g. a grid), it can be assumed that the sub-area 384 does not correspond to a structural element, because the repetitive pattern does not include isolated structural elements. Therefore, this cluster can be ignored or deleted when determining the one or more first areas at operation 320. The same can be applied to clusters determined along the second axis 373 (second clusters): if a given cluster includes a number of sub-areas which are below a threshold, the given cluster is ignored when determining the one or more first areas at operation 320.

Figure 4:
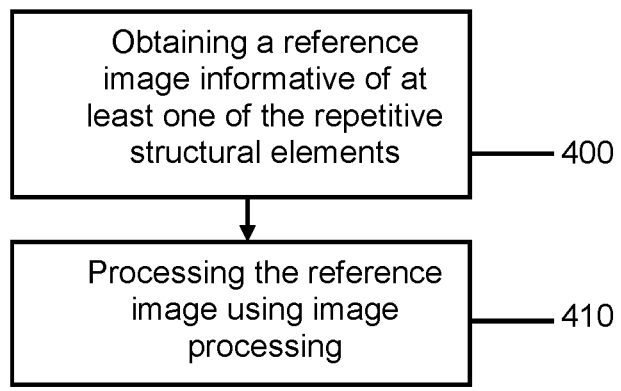
FIG. 4 illustrates a generalized flow-chart of a method of processing a reference image used in the method of FIG. 2.

Attention is now drawn to FIG. 4. According to some embodiments, the reference image informative of at least one of the repetitive structural elements can be processed using an image processing algorithm. According to some embodiments, the image processing algorithm attenuates repetitive patterns of the reference image. For example, partial whitening can be applied to the reference image. Partial whitening can include e.g. transforming the reference image in the frequency domain (e.g. transforming X(i,j)

indicative of the pixels of the reference image to X(f) in the frequency domain), degrading high/strong frequencies (e.g.

$$\left(\text{e.g. } X'(f) = \frac{X(f)}{\sqrt{|X(f)|}}\right)$$

and performing an inverse transformation to revert to an image (e.g. transforming X'(f) into X'(i,j)).

Figure 4A:
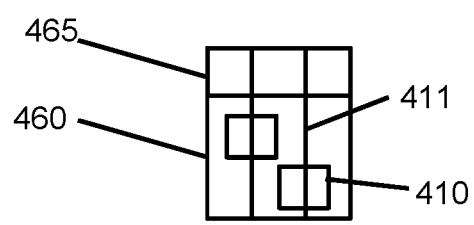
FIGS. 4A and 4B illustrate a non-limiting example of a use of the method of FIG. 4.
Figure 4B:
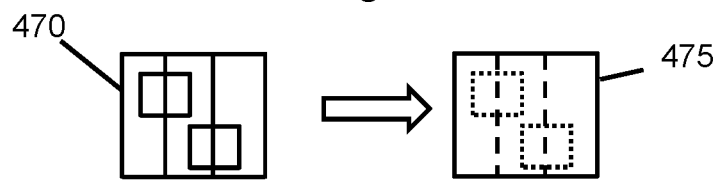

A non-limitative example of the method of FIG. 4 is depicted in FIG. 4A. As shown, the array 460 includes repetitive structural elements 410 and conductive lines 411. The conductive lines 411 extend up to the region 465 surrounding the array 460. As shown in FIG. 4B, a reference image 470 informative of the repetitive structural elements 410 has been obtained. Image processing (e.g. partial whitening), which attenuates repetitive patterns, is applied to the reference image 470 in order to obtain a corrected reference image 475. As shown, both the conductive lines 411 (which correspond to repetitive patterns) and the structural elements 410 (which also correspond to repetitive patterns) are attenuated in the corrected reference image 475. As a consequence, when a correlation is performed between the corrected reference image 475 and the image (as explained with reference to operation 210), the sub-areas corresponding to the structural elements will provide a higher correlation value than the sub-areas corresponding to the region, although both the sub-areas and the region include, in this embodiment, common repetitive features (conductive lines 411), thereby facilitating distinguishing between the array and the surrounding region.

According to some embodiments, a method can include obtaining (operation 500) an image of a specimen including one or more arrays and one or more surrounding regions. Operation 500 is similar to operation 200 above. In some embodiments, the image is acquired by an electron beam examination tool. In some cases, the image can have low signal to noise ratio, and therefore, the method of FIG. 2 which involves correlation with a reference image, is not always applicable. Low signal to noise ratio can be due to the size of the features present in the specimen, charging effects, etc. In some embodiments, due to the low signal to noise ratio, the structural elements of the arrays cannot be identified/distinguished within the arrays by visual inspection of the image. In some embodiments, the size of a pixel in the image can be larger than a size of a structural element and therefore the structural elements cannot be distinguished by visual inspection.

The method further includes obtaining (operation 510) data $D_{threshold}$ informative of pixel intensity of at least one of an array and of a surrounding region. $D_{threshold}$ can be obtained in particular during a setup phase, prior to run-time examination of the specimen. For example, during a setup phase, an image of a specimen similar to the specimen under examination during run-time is obtained. An operator, or an automatic algorithm (e.g. K-means algorithm) provides a first estimation of the location of the arrays and of the surrounding regions within the image. An average value $P_{array}$ of the pixel intensity of the arrays is computed and an average value $P_{region}$ of the pixel intensity of the surrounding regions is computed. These two values are expected to be different since the arrays and the surrounding regions contain different structural features. $D_{threshold}$ can be computed based e.g. on $P_{array}$ and on $P_{region}$. $D_{threshold}$ can correspond e.g. to the average between these two values, but this is not limitative.

The method further includes determining (operation 520) data representative of pixel intensity along a plurality of axis in the image. This can include in particular determining data $D_X$ representative of pixel intensity along each of a plurality of lines of the image, and data $D_Y$ representative of pixel intensity along each of a plurality of columns of the image. Data $D_X$ (resp. $D_Y$) can be computed e.g. as an average value of pixel intensity along each line (resp. column) of the image.

The method further includes using (operation 530) $D_X$, $D_Y$ and $D_{threshold}$ to distinguish between one or more first areas of the image corresponding to the one or more arrays and one or more second areas of the image corresponding the one or more regions.

Operation 530 can include identifying lines of the image for which $D_X$ is above (or below, depending on whether the pixel intensity is higher for arrays or for the surrounding regions) the threshold $D_{threshold}$ (obtained e.g. during a setup phase), and columns of the image for which $D_Y$ is above the threshold $D_{threshold}$ (obtained e.g. during a setup phase). Intersection of the lines and the columns which have been identified provides identification of the location of the arrays.

Figure 5:
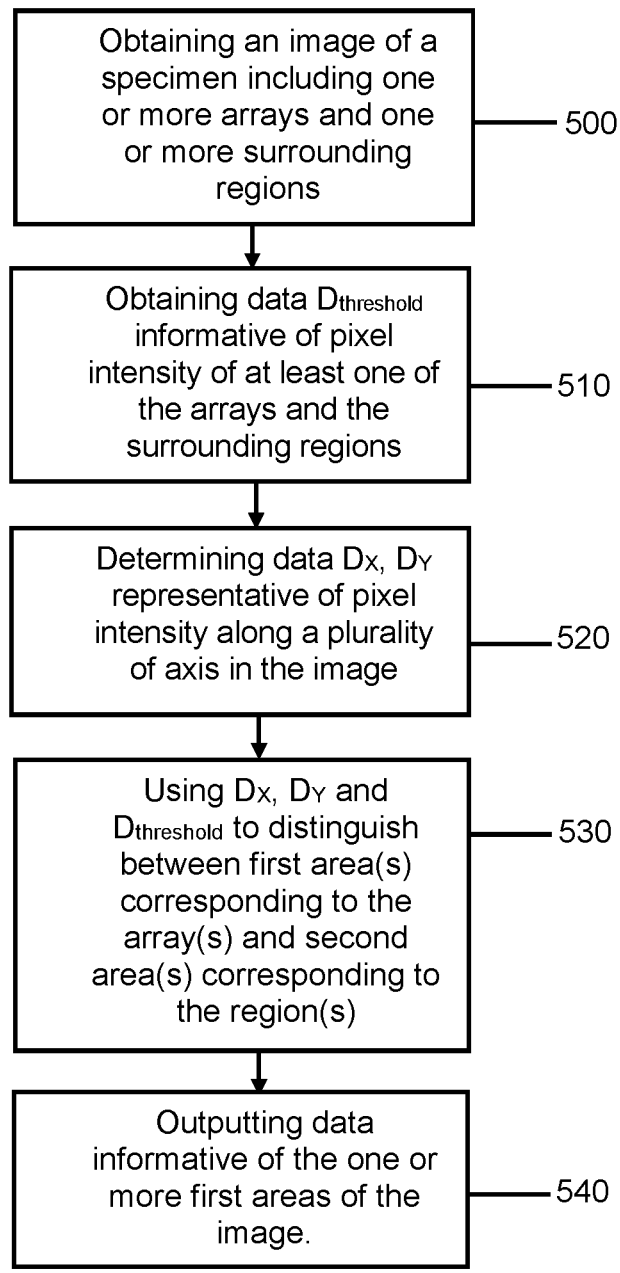
FIG. 5 illustrates a generalized flow-chart of another method of identifying an array including repetitive structural elements in an image of a specimen.
Figure 5A:
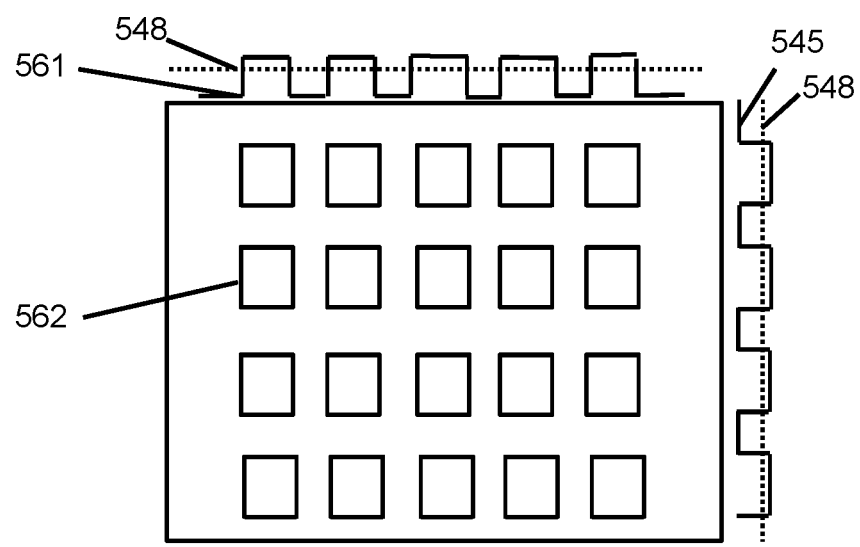
FIG. 5A illustrates a non-limiting example of an application of the method of FIG. 5.

A non-limitative example is provided in FIG. 5A. Assume for example that during a setup phase, it has been determined that pixel intensity is (on average) higher for arrays than for the surrounding regions ($P_{array}$ is larger than $P_{region}$), and that $D_{threshold}$ has been set as an average value of $P_{array}$ and $P_{region}$. Data $D_X$ informative of pixel intensity along the lines is depicted as curve 545 (this curve is purely illustrative and not limitative). As shown, for lines of the image on which the arrays 562 are located, the curve is above the threshold $D_{threshold}$ (referred to as 548). Data $D_Y$ informative of pixel intensity along the columns is depicted as curve 561 (this curve is purely illustrative and not limitative). As shown, for columns of the image on which the arrays 562 are located, the curve is above the threshold $D_{threshold}$ (referred to as 548).

The method further includes outputting (operation 540) data informative of the one or more first areas of the image. Operation 540 is similar to operation 230 described above. In particular, according to some embodiments, intersection between lines for which curve 545 is above the threshold 548, and columns for which curve 561 is above the threshold 549 provides an estimation of the location of the first areas corresponding to the location of the arrays.

According to some embodiments, at least operations 510, 530 and 540 are performed during run-time scanning of the specimen. In other words, the method of identification of the arrays in the image is efficient and therefore can be performed during a run-time phase.

Figure 6:
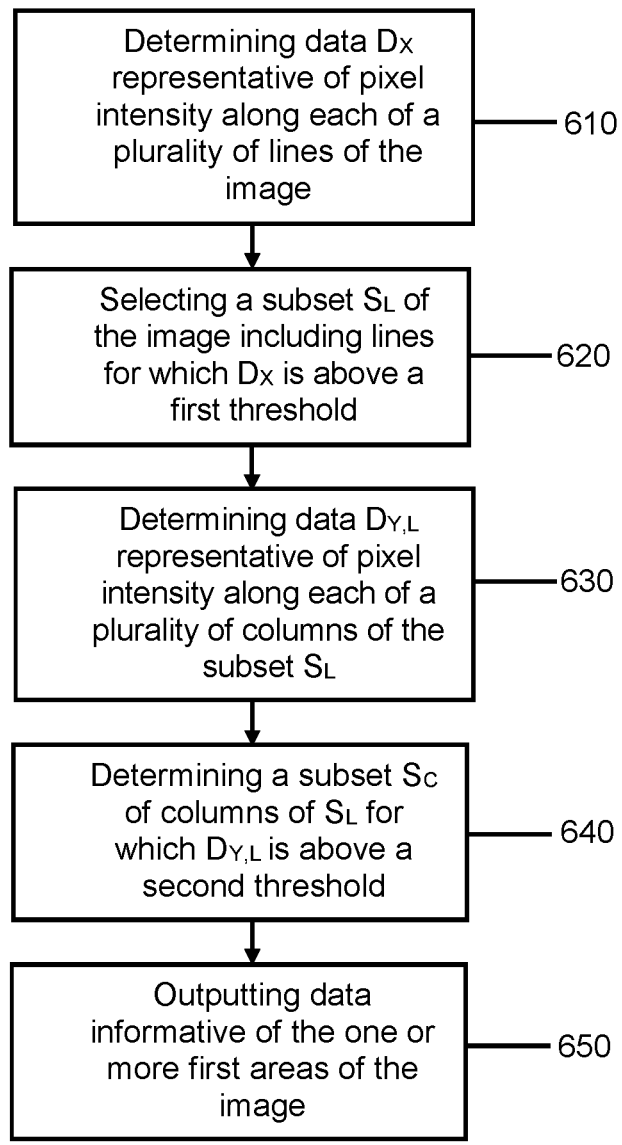
FIG. 6 illustrates a generalized flow-chart of another embodiment of a method of identifying an array including repetitive structural elements in an image of a specimen.
Figure 6A:
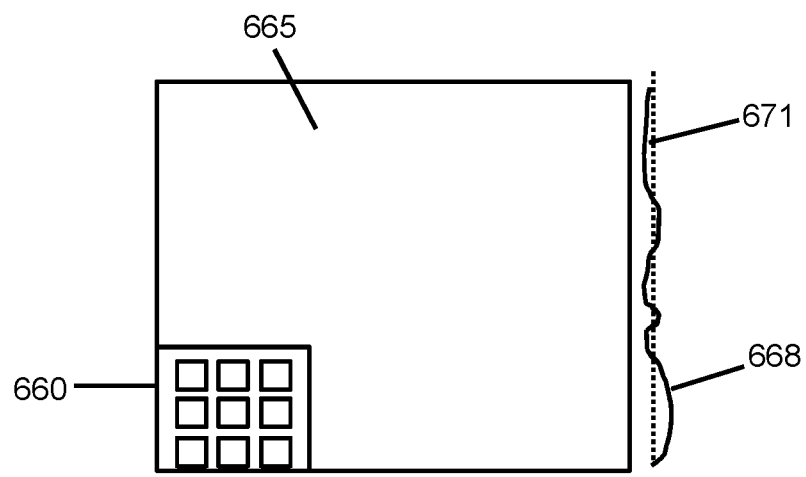
FIGS. 6A to 6C illustrate a non-limiting example of an application of the method of FIG. 6.

Attention is now drawn to FIG. 6. In some cases, data representative of pixel intensity along lines and/or columns of the image on which the arrays are located can be close to data representative of pixel intensity along other lines and/or columns. A non-limitative example is illustrated in FIG. 6A, in which an array 660 is located at the bottom left corner of the image and is surrounded by a large region 665. The method of FIG. 6 is a possible embodiment of a solution which enables improving differentiation between lines and columns of the image on which the arrays are located, and other lines and columns.

The method includes determining (operation 610) data $D_X$ representative of pixel intensity (e.g. average of pixel intensity along the lines) along each of a plurality of lines of the images. $D_X$ is represented as curve 668 in FIG. 6A. Assume a first threshold $D_{threshold,1}$ has been obtained (e.g. during setup phase before run-time examination). $D_{threshold,1}$ is informative of pixel intensity of at least one of the arrays and the regions. In some embodiments, $D_{threshold,1}$ can be selected as a strict threshold (high threshold) to maximize probability of distinguishing between lines of the image corresponding to the arrays and other lines. For example, assume that during a setup phase (performed on an image of a specimen similar to the specimen under examination during run-time), an average value $P_{array}$ of the pixel intensity of the arrays has been computed and an average value $P_{region}$ of the pixel intensity of the surrounding regions has been computed (as explained above). Assume for example that $P_{array}$ is higher than $P_{region}$. $D_{threshold,1}$ can selected with a value which is higher than $P_{region}$ to maximize probability to remove lines corresponding to the surrounding regions. For example, $D_{threshold,1}$ can be selected as follows: $D_{threshold,1} = P_{region} + N*\sigma$ (with $\sigma$ the standard deviation of the pixel intensity of the surrounding regions, and N is an integer equal e.g. to 2).

Figure 6B:
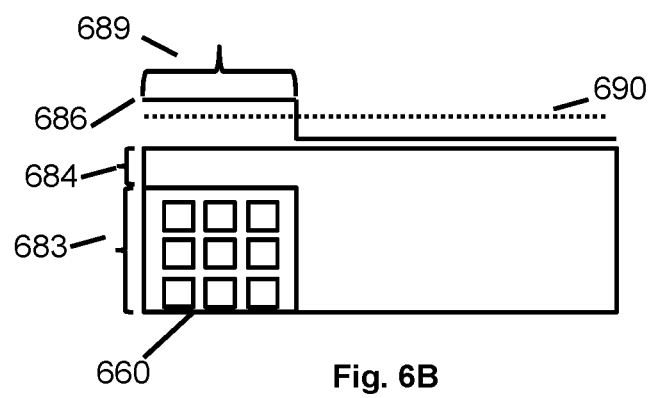

The method includes selecting a subset SL (represented as 682) of the image including lines of the image for which $D_X$ is above $D_{threshold,1}$. As shown, subset SL includes lines 683 of the image on which the array 660 is located, and additional lines 684 of the image which do not include the array 660 (however, the pixel intensity of these additional lines is above $D_{threshold,1}$). The method further includes determining (operation 630) data $D_{Y,SL}$ (curve 686 in FIG. 6B) representative of pixel intensity (e.g. average of pixel intensity along the columns) along each of a plurality of columns of the subset SL. The method includes determining (operation 640) a subset $C_{SL}$ (referred to as 689) of columns of SL for which $D_{Y,SL}$ is above a second threshold 690. This second threshold 690 can be obtained based on measurements performed during a setup phase, prior to run-time examination. For example, the second threshold can be set equal to an average value of $P_{array}$ (average pixel intensity of the arrays) and $P_{region}$ (average pixel intensity of the surrounding regions). This is however not limitative.

Columns $C_{SL}$ (reference 689) indicate position of the array along the line axis. Determination of position and size of the array along the column axis (Y axis) of the image can then be performed which thus yields the one or more first areas (operation 650), corresponding to the array(s) in the image. Position of the one or more first areas (corresponding to the array(s)) in the image can be provided and/or position of one or more second areas (corresponding to the surrounding regions) in the image (which correspond to all areas which have not been identified as the first areas) can be provided.

Figure 6C:
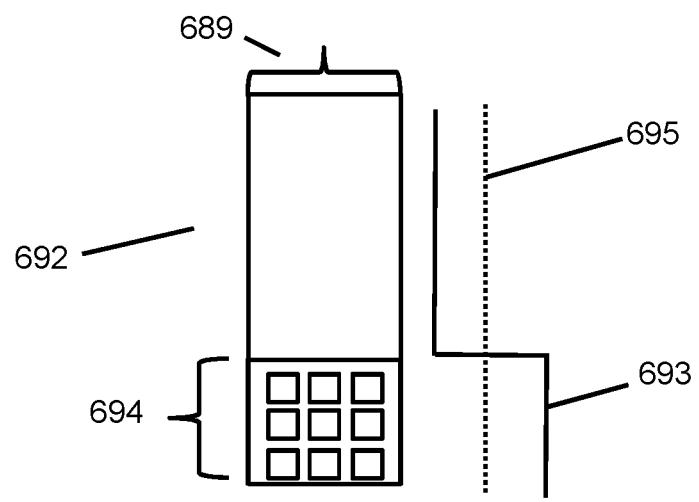

Indeed, once the columns 689 of the image corresponding to the array have been identified, it is then easier to distinguish between the lines of the image including the array, and the other lines of the image, as visible in FIG. 6C. A subset $S'_L$ (referred to as 692 in FIG. 6C) of the image is considered. This subset $S'_L$ includes all lines of the image, and is limited to the columns 689 of the image identified in the previous operation. The method further includes determining data (referred to as 693) representative of pixel intensity (e.g. average pixel intensity) along each of a plurality of lines of the subset $S'_L$ (692), and determining lines 694 of the image for which data 693 is above a third threshold 695 (in some embodiments, the third threshold 695 is equal to the second threshold 690, but this is not mandatory). As visible in FIG. 6C, it is now easier to differentiate between lines of the image including the array and other lines based on pixel intensity. These lines 694, together with the columns 689, define the one or more first areas of the image corresponding to the array(s). The other areas of the image correspond to second areas of the image corresponding to the region(s) surrounding the array(s).

In the example of FIGS. 6 to 6C, the method starts by selecting a subset SL of the image including lines for which average pixel intensity is above a threshold. It is understood that the method can be performed equivalently by first selecting a subset of columns. In this case, the method can include:

- determining data $D_Y$ representative of pixel intensity along each of a plurality of columns of the image (equivalent to operation 610);
- selecting a subset $S_C$ of the image including columns of the image for which $D_Y$ is above a first threshold (equivalent to operation 620);
- determining data $D_{X,SC}$ representative of pixel intensity along each of a plurality of lines of the subset $S_C$ (equivalent to operation 630);
- determining a subset $L_{SC}$ of lines of $S_C$ for which $D_{X,SC}$ is above a second threshold (equivalent to operation 640);
- determining the one or more first areas corresponding to the array(s) based at least on $L_{SC}$ (equivalent to operation 650—since the lines of the image corresponding to the array are known, it becomes easier to identify the columns of the image corresponding to the array, similarly to what was explained with reference to FIG. 6C).

According to some embodiments, this method also enables estimating the one or more first areas of the image including only the at least one or more arrays up to the borders separating the array(s) from the surrounding region(s). In particular, according to some embodiments, the method enables identifying the arrays up to the borders, excluding the one or more second areas corresponding to the one or more regions.

Figure 7:
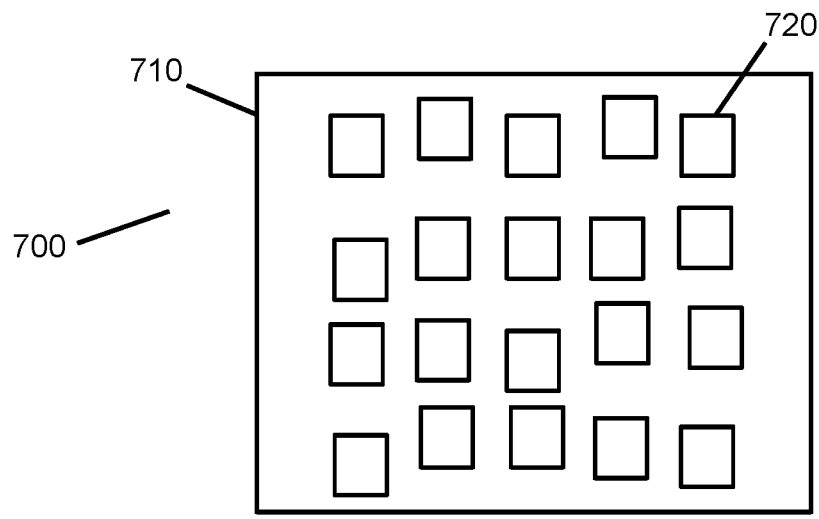
FIG. 7 illustrates a non-limiting example of a distorted image of an array including repetitive structural elements.

Attention is now drawn to FIG. 7. Assume that an image of a specimen has been obtained, in which one or more first areas corresponding to one or more arrays 710 each including repetitive structural elements 720 have been identified. This identification can rely e.g. on the various embodiments described above, or can rely on other identification methods. Therefore, an image 700 limited to the one or more first areas (corresponding to the arrays) is available, without the region(s) surrounding the one or more arrays. In some embodiments, the image 700 includes both one or more first areas (corresponding to the arrays), and one or more second areas (corresponding to the regions). Since position of the first areas is known, it is possible to operate only on the first areas. It will be referred hereinafter to an image 700 including only the first areas (corresponding to the array(s)), but it is understood that the method can be applied similarly to an image including both first and second areas, by applying the method only on the first areas of the image.

As visible in FIG. 7, in some embodiments, image 700 of the array(s) is distorted. In particular, position of the structural elements 720 in the array as visible in the image 700 is not compliant with their expected position (true position in the specimen) in the array. This can be due to various factors, such as measurement errors of the examination tool, etc.

Figure 8:
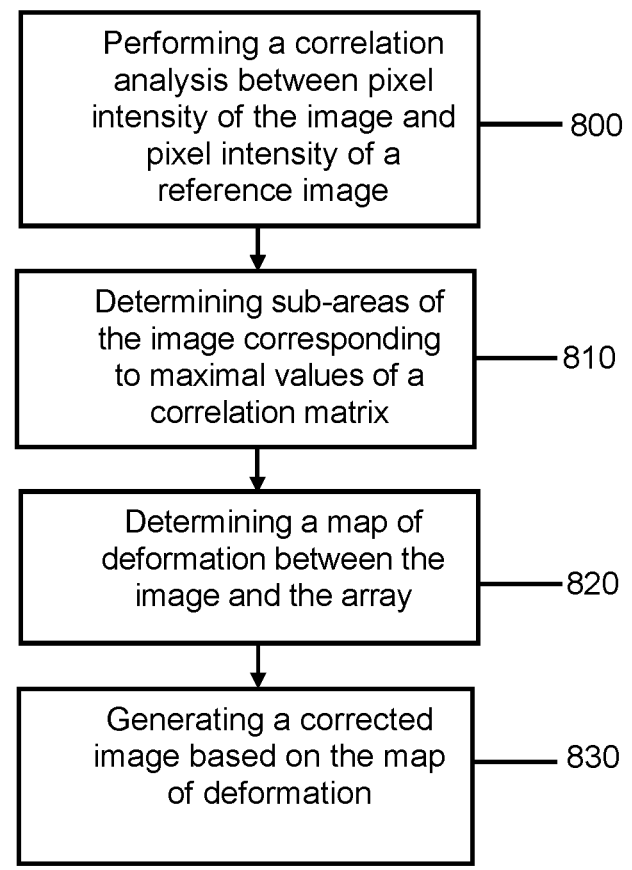
FIG. 8 illustrates a generalized flow-chart of a method of correcting distortion in the image of FIG. 7.

Distortion can be problematic when attempting to use image 700 for various applications, such as defect detection and/or classification. It is therefore required to correct this distortion. FIG. 8 illustrates an embodiment of a method of correcting the distortion present in the image of the array(s).

The method includes performing (operation 800) a correlation analysis between pixel intensity of the image 700 and pixel intensity of a reference image informative of at least one of the repetitive structural elements. The reference image used at operation 800 can be different from the reference image used at operation 210 to identify the first areas of the image corresponding to the array (in this case, a second reference image is used at operation 800, different from a first reference image used at operation 210). This is, however, not mandatory. An output of the correlation analysis is a second correlation matrix (which can be different from the correlation matrix obtained at operation 210). In some embodiments, it is possible to reuse the correlation matrix obtained at operation 210 (in this case, only the values corresponding to the one or more first areas are used).

The method can further include determining (operation 810) sub-areas of the image corresponding to values of the second correlation matrix meeting an amplitude criterion. In particular, the amplitude criterion can dictate that sub-areas of the image, associated with maximal values (e.g. local maximal values) of the second correlation matrix, are identified.

Figure 8A:
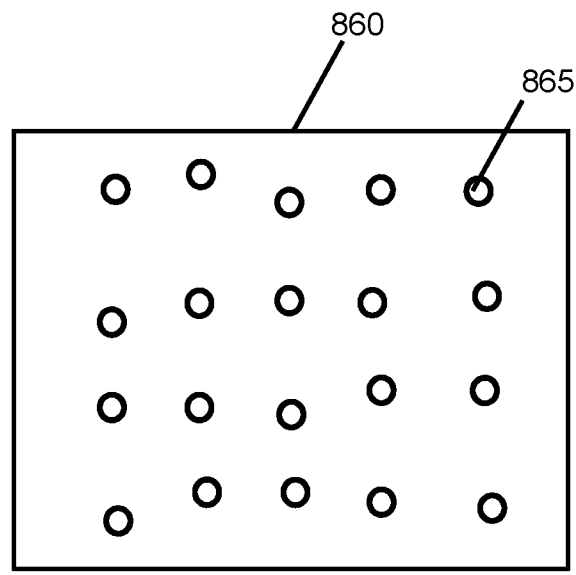
FIGS. 8A to 8C illustrate a non-limiting example of an application of the method of FIG. 8.

As shown in FIG. 8A, the second correlation matrix 860 includes peaks of correlation (maximal values) located at given sub-areas 685. These sub-areas 865 correspond to an estimation of the location of the repetitive structural elements (in particular to a central area of each structural element). Indeed, since the correlation analysis involves correlating pixel intensity of the image with pixel intensity of a reference image informative of a repetitive structural element, it is expected that sub-areas of the image 700, including the repetitive structural elements, will provide a high correlation value relative to sub-areas of the image 700 which do not include the repetitive structural elements.

The method can further include determining (operation 820) a map of deformation between the image 700 and the array. The map of deformation can be determined based on a position of the sub-areas (as determined using the second correlation matrix) and on data informative of an expected position of the repetitive structural elements in the array.

Figure 8B:
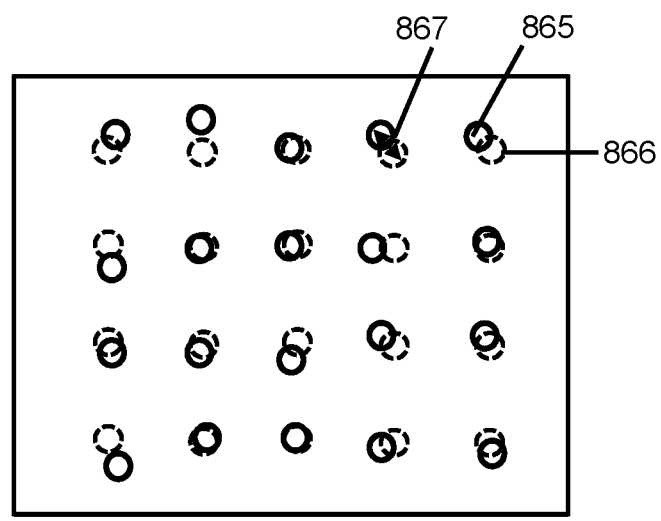

A non-limitative example is depicted in FIG. 8B, which illustrates position of the sub-areas 865 corresponding to maximal values of the second correlation matrix, and expected position 866 of the structural elements in the array. For each sub-area, it is possible to determine a vector of deformation 867, indicative of the difference between the position of the structural element in the image (estimated using the maximal values of the second correlation matrix) and the expected position 866 of the corresponding structural element.

According to some embodiments, a map of deformation can be determined for the whole image. Indeed, as mentioned above, a deformation (see 867, hereinafter "$DF_{central}$") between a position of the sub-areas 865 in the image and data informative of an expected position of the repetitive structural elements in the array is determined. This corresponds to the deformation of the central part of each of the structural element with respect to its expected position. In order to determine deformation of other pixels of the image (which do not necessarily correspond to the central part of the structural element), the method can include applying an interpolation method on the values of $DF_{central}$ over the image. This provides an estimation of the deformation for all other pixels located between the different sub-areas 865. According to some embodiments, the interpolation method is applied separately for the deformation along the X axis (lines of the image) and for the deformation along the Y axis (columns of the image).

Figure 8C:
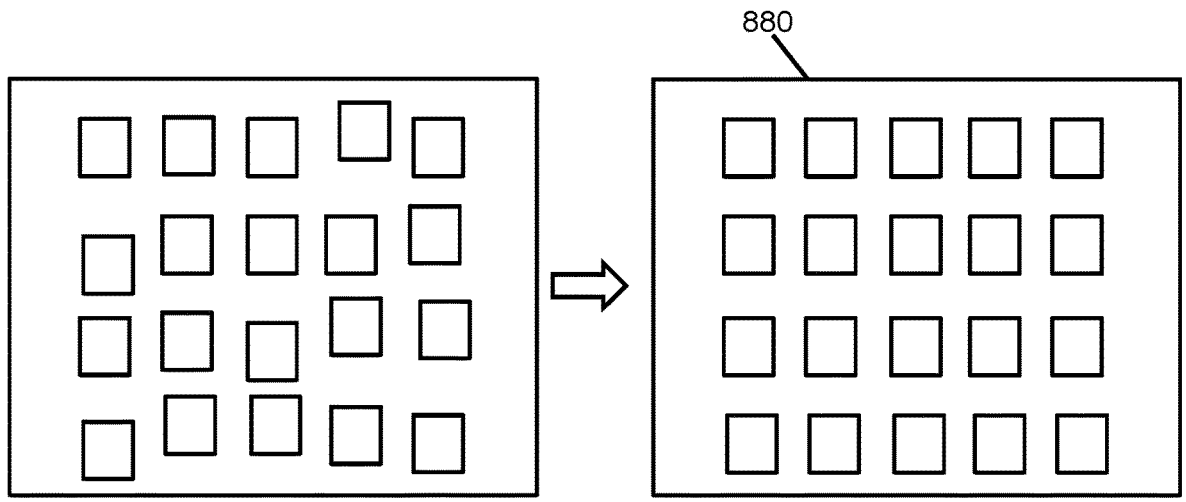

The method can further include generating (operation 830) a corrected image 880 (see FIG. 8C) based on the map of deformation. This can include moving the pixels of the image based on the map of deformation, so that a position of the sub-areas 865 (corresponding to the peaks of the second correlation matrix) in the corrected image 880 and data informative of an expected position of the repetitive structural elements in the array, meet a proximity criterion (e.g. the difference in position is below a threshold).

Figure 9:
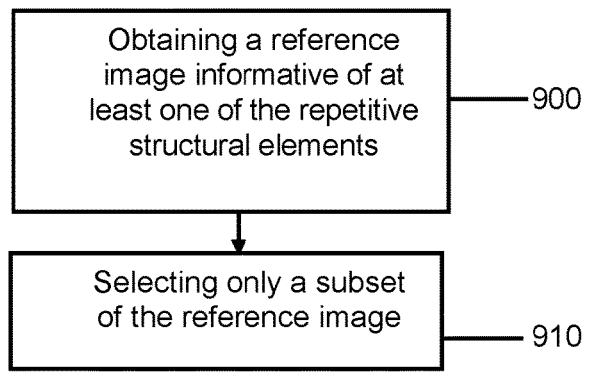
FIG. 9 illustrates a generalized flow-chart of a method of processing a reference image used in the method of FIG. 8.

Attention is now drawn to FIG. 9. According to some embodiments, a method can include obtaining (900) a reference image informative of at least one of the repetitive structural elements and selecting (910) only a subset of the reference image as the second reference image. According to some embodiments, size of the subset is based on a compromise. On one hand, size of the subset must be large enough to be able to identify the position of the structural elements on the image, and on the other hand, size of the subset must be small enough to obtain a sufficient number of correlation values.

Figure 9A:
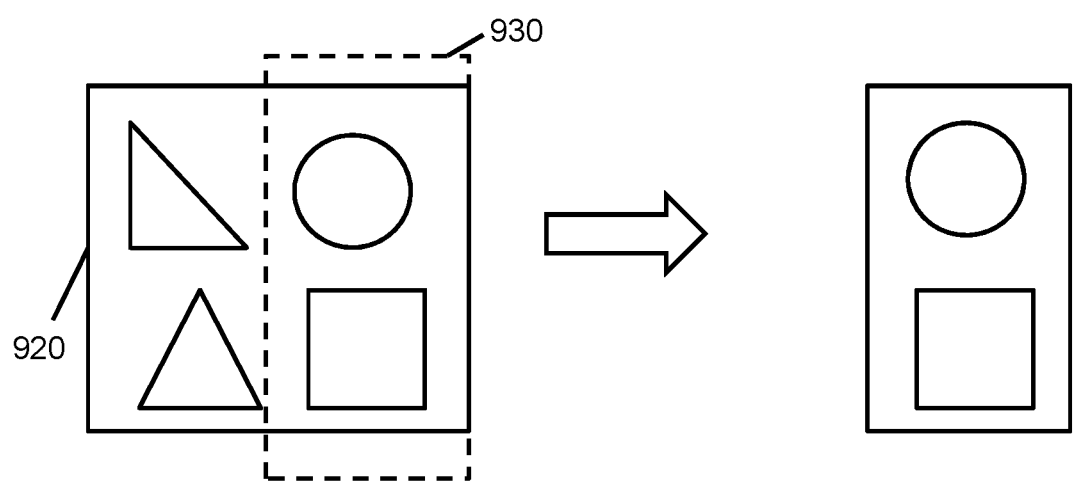
FIG. 9A illustrate a non-limiting example of an application of the method of FIG. 9.

A non-limitative example is illustrated in FIG. 9A.

A reference image 920 has been obtained. A subset 930 of the reference image 920 is selected. This subset can be used as the second reference image in the method of FIG. 8.

According to some embodiments, the subset 930 can be selected using an iterative method, during e.g. a setup phase. The method starts with a first subset (maximal size of this subset can be set e.g. by a user). The method of FIG. 8 is performed using this first subset. Then, the resolution is increased, meaning that the size of the first subset is decreased. The method of FIG. 8 is performed again using this new subset, and performance of the output is compared to the previous iteration. If the performance is improved, then the method is repeated with a new subset of smaller size. If the performance is not improved, then the method is stopped and the subset obtained at the previous iteration is selected.

It is to be understood that the invention is not limited in its application to the details set forth in the description contained herein or illustrated in the drawings.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

What is claimed is:

1. A system to examine a semiconductor specimen, the system comprising a processor and memory circuitry (PMC) configured to:
obtain an image of the semiconductor specimen including:
one or more arrays, each including repetitive structural elements; and
one or more regions, each region at least partially surrounding a corresponding array and including features different from the repetitive structural elements; and
wherein the PMC is configured to, during run-time scanning of the semiconductor specimen:
perform a correlation analysis between pixel intensity of the image and pixel intensity of a reference image informative of at least one of the repetitive structural elements, to obtain a correlation matrix,
determine sub-areas of the image corresponding to values of the correlation matrix meeting an amplitude criterion,
cluster the sub-areas into one or more clusters, based on data informative of a distance between the repetitive structural elements in the array,
determine one or more first areas based at least on the one or more clusters,
use the correlation matrix to distinguish between the one or more first areas of the image corresponding to the one or more arrays and one or more second areas of the image corresponding the one or more regions, and
output data informative of the one or more first areas of the image.

2. The system of claim 1, wherein the one or more arrays are separated from the one or more regions by one or more borders, wherein the PMC is further configured to estimate the one or more first areas of the image including only at least one or more arrays up to the borders.

3. The system of claim 1, the PMC further configured to apply image processing to the reference image, wherein the image processing attenuates repetitive patterns of the reference image.

4. The system of claim 1, the PMC further configured to:
cluster the sub-areas into one or more first clusters, based on data informative of a distance between the repetitive structural elements in the array along a first axis,
cluster the sub-areas into one or more second clusters, based on data informative of a distance between the repetitive structural elements in the array along a second axis, and
use the first and second clusters to distinguish between the one or more first areas of the image corresponding to the one or more arrays and the one or more second areas of the image corresponding to the one or more regions.

5. The system of claim 1, the PMC further configured, for each cluster, to:
determine a polygon surrounding the one or more clusters, and
output the polygon as a first area of the image.

6. The system of claim 1, wherein the one or more clusters include only clusters for which a number of sub-areas meets a threshold.

7. The system of claim 1, the PMC further configured to obtain data informative of the amplitude criterion in a setup phase prior to run-time examination of the semiconductor specimen.

8. The system of claim 1, the PMC further configured to:
perform a correlation analysis between pixel intensity of the one or more first areas of the image and pixel intensity of a second reference image informative of at least one of the repetitive structural elements, to obtain a second correlation matrix,
determine sub-areas of the one or more first areas of the image corresponding to values of the second correlation matrix meeting an amplitude criterion,
determine a map of deformation between the one or more first areas of the image and the array, based at least on a position of the sub-areas in the one or more first areas of the image and data informative of an expected position of the repetitive structural elements in the array, and
generate a corrected image based on the map of deformation.

9. The system of claim 8, the PMC further configured to generate the corrected image such that a position of the sub-areas in the corrected image and data informative of an expected position of the repetitive structural elements in the array meet a proximity criterion.

10. The system of claim 8, the PMC further configured to:
determine deformation $DF_{central}$ between a position of the sub-areas in the one or more first areas of the image and data informative of an expected position of the repetitive structural elements in the array, and
determine a map of deformation between the one or more first areas of the image and the array of the semiconductor specimen, based on an interpolation method applied at least to $DF_{central}$.

11. The system of claim 8, the PMC further configured to obtain the reference image informative of at least one of the repetitive structural elements and to select only a subset of the reference image as the second reference image.

12. A method of examining a semiconductor specimen by a processor and memory circuitry (PMC), the method comprising:
obtaining an image of the semiconductor specimen including:
one or more arrays, each including repetitive structural elements; and
one or more regions, each region at least partially surrounding a corresponding array and including features different from the repetitive structural elements; and
during run-time scanning of the semiconductor specimen:
performing a correlation analysis between pixel intensity of the image and pixel intensity of a reference image informative of at least one of the repetitive structural elements, to obtain a correlation matrix,
determining sub-areas of the image corresponding to values of the correlation matrix meeting an amplitude criterion,
clustering the sub-areas into one or more clusters, based on data informative of a distance between the repetitive structural elements in the array,
determining one or more first areas based at least on the one or more clusters,
using the correlation matrix to distinguish between the one or more first areas of the image corresponding to the one or more arrays and one or more second areas of the image corresponding the one or more regions, and
outputting data informative of the one or more first areas of the image.

13. The method of claim 12, wherein the one or more arrays are separated from the one or more regions by one or more borders, wherein the method further comprises estimating the one or more first areas of the image including only at least one or more arrays up to the borders, and excluding the one or more second areas corresponding to the one or more regions.

14. The method of claim 12, further comprising:
clustering the sub-areas into one or more first clusters, based on data informative of a distance between the repetitive structural elements in the array along a first axis,
clustering the sub-areas into one or more second clusters, based on data informative of a distance between the repetitive structural elements in the array along a second axis, and
using the first and second clusters to distinguish between one or more first areas of the image corresponding to the one or more arrays and one or more second areas of the image corresponding to the one or more regions.

15. The method of claim 12, wherein the one or more clusters include only clusters for which a number of sub-areas meets a threshold.

16. The method of claim 12, further comprising:
performing a correlation analysis between pixel intensity of the one or more first areas of the image and pixel intensity of a second reference image informative of at least one of the repetitive structural elements, to obtain a second correlation matrix,
determining sub-areas of the one or more first areas of the image corresponding to values of the second correlation matrix meeting an intensity criterion,
determining a map of deformation between the one or more first areas of the image and the array, based at least on a position of the sub-areas in the one or more first areas of the image and data informative of an expected position of the repetitive structural elements in the array, and
generating a corrected image based on the map of deformation.

17. The method of claim 16, further comprising:
determining deformation $DF_{central}$ between a position of the sub-areas in the one or more first areas of the image and data informative of an expected position of the repetitive structural elements in the array, and
determining a map of deformation between the one or more first areas of the image and the array of the semiconductor specimen, based on an interpolation method applied at least to $DF_{central}$.

18. A non-transitory computer readable medium comprising instructions that, when executed by a PMC, cause the PMC to perform operations comprising:
obtaining an image of a semiconductor specimen including:
one or more arrays, each including repetitive structural elements; and
one or more regions, each region at least partially surrounding a corresponding array and including features different from the repetitive structural elements; and
during run-time scanning of the semiconductor specimen:
performing a correlation analysis between pixel intensity of the image and pixel intensity of a reference image informative of at least one of the repetitive structural elements, to obtain a correlation matrix,
determining sub-areas of the image corresponding to values of the correlation matrix meeting an amplitude criterion,
clustering the sub-areas into one or more clusters, based on data informative of a distance between the repetitive structural elements in the array,
determining one or more first areas based at least on the one or more clusters,
using the correlation matrix to distinguish between the one or more first areas of the image corresponding to the one or more arrays and one or more second areas of the image corresponding the one or more regions, and
outputting data informative of the one or more first areas of the image.

* * * * *